(12) United States Patent
Mahajan et al.

(10) Patent No.: US 7,103,544 B2
(45) Date of Patent: Sep. 5, 2006

(54) METHOD AND APPARATUS FOR PREDICTING WORD ERROR RATES FROM TEXT

(75) Inventors: Milind Mahajan, Redmond, WA (US); Yonggang Deng, Towson, MD (US); Alejandro Acero, Bellevue, WA (US); Asela J. R. Gunawardana, Seattle, WA (US); Ciprian Chelba, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/146,324

(22) Filed: Jun. 6, 2005

(65) Prior Publication Data

US 2005/0228670 A1 Oct. 13, 2005

Related U.S. Application Data

(62) Division of application No. 10/365,850, filed on Feb. 13, 2003.

(51) Int. Cl.
*G10L 15/06* (2006.01)
*G10L 15/14* (2006.01)

(52) U.S. Cl. ............ 704/240; 704/255; 704/256.2

(58) Field of Classification Search ........... 704/236, 704/240, 243, 244, 255, 256, 256.2
See application file for complete search history.

(56) References Cited

U.S. PATENT DOCUMENTS

| | | | | |
|---|---|---|---|---|
| 4,817,156 A | 3/1989 | Bahl et al. ............ 704/256.2 |
| 5,050,215 A | 9/1991 | Nishimura |
| 5,515,475 A | 5/1996 | Gupta et al. |
| 5,579,436 A | 11/1996 | Chou et al. |
| 5,606,644 A | 2/1997 | Chou et al. ............ 704/243 |
| 6,101,241 A | 8/2000 | Boyce et al. |
| 6,137,863 A | 10/2000 | Brown et al. |
| 6,182,039 B1 | 1/2001 | Rigazio et al. ............ 704/257 |
| 6,185,530 B1 | 2/2001 | Ittycheriah et al. |
| 6,385,579 B1 | 5/2002 | Padmanabhan et al. |
| 6,456,969 B1 | 9/2002 | Beyerlein |
| 6,622,121 B1 | 9/2003 | Crepy et al. ............ 704/243 |
| 6,684,185 B1 | 1/2004 | Junqua et al. |
| 6,711,541 B1 | 3/2004 | Kuhn et al. |
| 6,859,774 B1 | 2/2005 | Mangu et al. ............ 704/255 |
| 2002/0032549 A1 | 3/2002 | Axelrod et al. |

OTHER PUBLICATIONS

Y. Deng et al., "Estimating Speech Recognition Error Rate Without Acoustic Text Data," 8th European Conference on Speech Communication and Technology, Eurospeech, 2003.

A. Nakamura, "Predicting Speech Recognition Performance," 5th European Conference on Speech Communication and Technology, Eurospeech, 1997.

(Continued)

*Primary Examiner*—Martin Lerner
(74) *Attorney, Agent, or Firm*—Theodore M. Magee; Westman, Champlin & Kelly, P.A.

(57) ABSTRACT

A method of modeling a speech recognition system includes decoding a speech signal produced from a training text to produce a sequence of predicted speech units. The training text comprises a sequence of actual speech units that is used with the sequence of predicted speech units to form a confusion model. In further embodiments, the confusion model is used to decode a text to identify an error rate that would be expected if the speech recognition system decoded speech based on the text.

9 Claims, 5 Drawing Sheets

OTHER PUBLICATIONS

G. Doggington, Phonetically Sensitive Discriminants for Improved Speech Recognition, International Conference of Acoustics, Speech and Signal Processing, ICASSP 1989.

M. Siu et al., "Improved Estimation, Evaluation and Applications of Confidence Measures for Speech Recognition," 5th European Conference on Speech Communication and Technology, Eurospeech 1997.

Printz, et al., "Theory and Practice of Acoustic Confusability," Proceeding of the ISCA ITRW ASR2000, pp. 77-84, Paris, France (Sep. 18-20, 2000).

Cremelie et al., "In Search of Better Pronunciation Models for Speech Recognition," Speech Communication 29, pp. 115-136 (1999).

Ristad et al., "Learning String Edit Distance," IEEE Trans. PAMI, pp. 1-33.

METHOD AND APPARATUS FOR PREDICTING WORD ERROR RATES FROM TEXT

REFERENCE TO RELATED APPLICATIONS

This application is a divisional of and claims priority from U.S. patent application Ser. No. 10/365,850, filed on Feb. 13, 2003 and entitled METHOD AND APPARATUS FOR PREDICTING WORD ERROR RATES FROM TEXT, which is hereby incorporated by reference.

BACKGROUND OF THE INVENTION

The present invention relates to speech recognition. In particular, the present invention relates to modeling the performance of speech recognition systems.

In speech recognition, an acoustic signal is converted into a sequence of words using an acoustic model and a language model. The acoustic model converts features of the acoustic signal into possible sequences of sub-word speech units such as phones with probabilities. The language model provides probability distributions for various sequences of words that can be formed from the sequences of phones identified by the acoustic model.

Acoustic models are typically trained by having a speaker read from a known text and then crafting the acoustic model so that it predicts the training text from the training speech. Language models are typically trained from large corpora of text by simply identifying the probability of various word sequences in the corpora.

The performance of the resulting speech recognition system is somewhat tied to the training text used to train the acoustic model and the language model. As a result, in certain task domains, the speech recognition system will perform better than in other task domains. In order to determine how a speech recognition system will work in a particular task domain, someone must speak the words that a user is expected to use when performing the task in order to generate acoustic data that can be decoded by the system. Hiring people to generate a sufficient amount of acoustic data to determine the performance of the speech recognition system is expensive and forms a barrier to developing speech enabled computer applications.

In addition, because it is expensive to produce acoustic data, such data has not been generated for the entire corpora used to train the language model. As a result, the language model has typically been trained without examining how the acoustic model will perform on the language model corpora. Thus, it would be beneficial to have a system that allowed a corpus of text to be used in measuring the performance of the combination of an acoustic model and a language model without the need for acoustic data. This would allow for discriminative training of language models in combination with acoustic models.

SUMMARY OF THE INVENTION

A method of modeling a speech recognition system includes decoding a speech signal produced from a training text to produce a sequence of predicted speech units. The training text comprises a sequence of actual speech units that is used with the sequence of predicted speech units to form a confusion model. In further embodiments, the confusion model is used to decode a text to identify an error rate that would be expected if the speech recognition system decoded speech based on the text.

DETAILED DESCRIPTION OF ILLUSTRATIVE EMBODIMENTS

Figure 1:
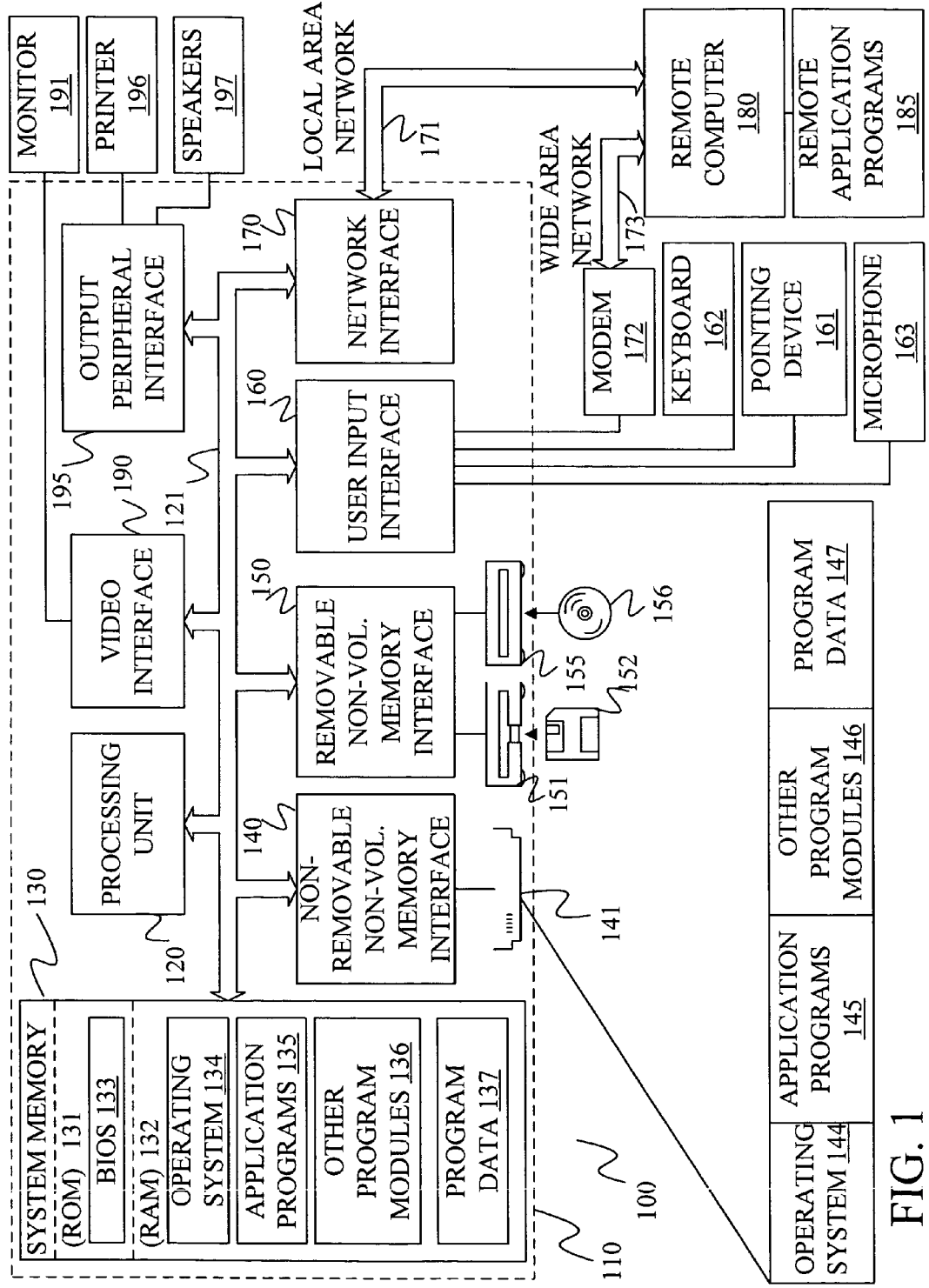
FIG. 1 is a block diagram of a general computing environment in which embodiments of the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Under the present invention, a model of the performance of a speech recognition system is constructed and is used to identify the likely error rate of a speech recognition system given a text. This model is referred to as a confusion model in the description below. By utilizing the confusion model, acoustic data is not needed to estimate how the speech recognition system will perform in decoding speech produced from a particular text.

Figure 2:
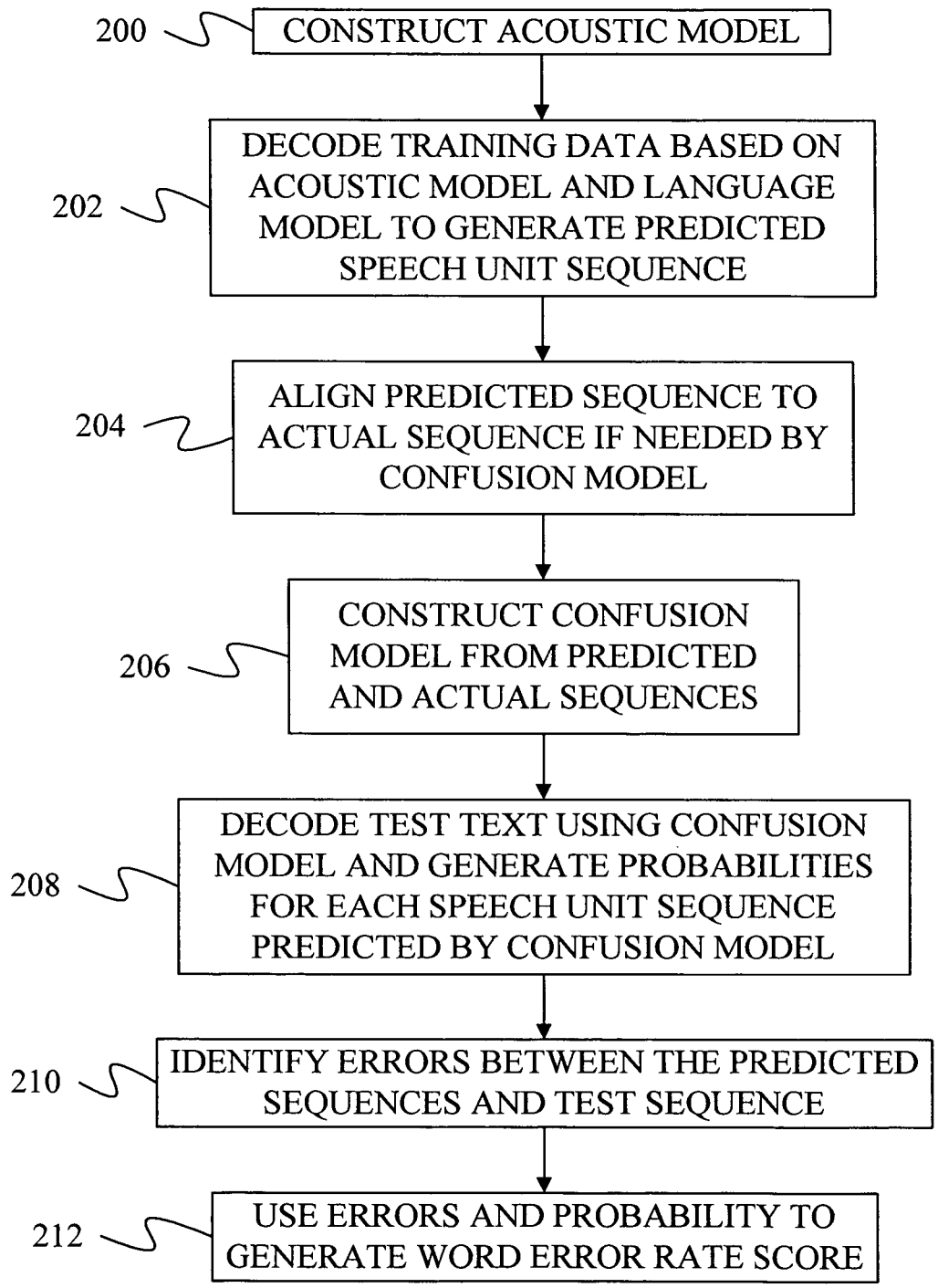
FIG. 2 is a flow diagram of a method of constructing and using a confusion model under embodiments of the present invention.

FIG. 2 provides a flow diagram of a method of constructing and using a confusion model under the present invention.

At step 200 of FIG. 2, an acoustic model 300 is trained. This involves having a person 308 recite a portion of a training text 304 to generate an acoustic signal. The acoustic signal is detected by a receiver 309, which converts the signal into an electrical signal. The electrical signal is provided to a feature extractor, which extracts one or more features from the electrical signal. Methods for identifying such feature vectors are well known in the art and include 13-dimensional Mel-Frequency Cepstrum Coefficients (MFCC) extraction, which produces 13 cepstral values per feature vector. The cepstral feature vector represents the spectral content of the speech signal within a corresponding frame of the electrical signal. The extracted feature vectors are provided to a trainer 302, which uses the features to train acoustic model 300. Methods for constructing acoustic models are well known in the art. The acoustic model may take any desired form, including but not limited to a Hidden Markov Model.

At step 202, a portion of training data 304 is spoken by a person 308 to generate a test signal that is decoded using the trained acoustic model. The acoustic signal is converted into feature vectors by receiver 309 and feature extractor 310, and the feature vectors are provided to a decoder 312.

Decoder 312 uses acoustic model 300, a dictionary 315 and a training language model 314 to decode the features into a predicted sequence of speech units. In many embodiments, the speech units are phonetic units such as phones, bi-phones, or triphones.

Note that steps 200 and 202 can be performed using the leave-one-out technique in which training data 304 is divided into multiple sets of training data. All but one set is used to construct the acoustic model, and the set that is not used to construct the model is decoded using the acoustic model and the language model. Steps 200 and 202 are then repeated by selecting a different set from the training data as the set to be decoded and constructing the acoustic model from the remaining sets. This is repeated for each set of data in training data 304 so that a separate set of predicted speech units is provided for each set of data in training data 304.

If the language model used in decoding the training data has also been trained using the training data, it would also be necessary to train the language model using a similar leave-one-out procedure. Leave-one-out technique is beneficial in avoiding bias in the predicted speech units.

Figure 3:
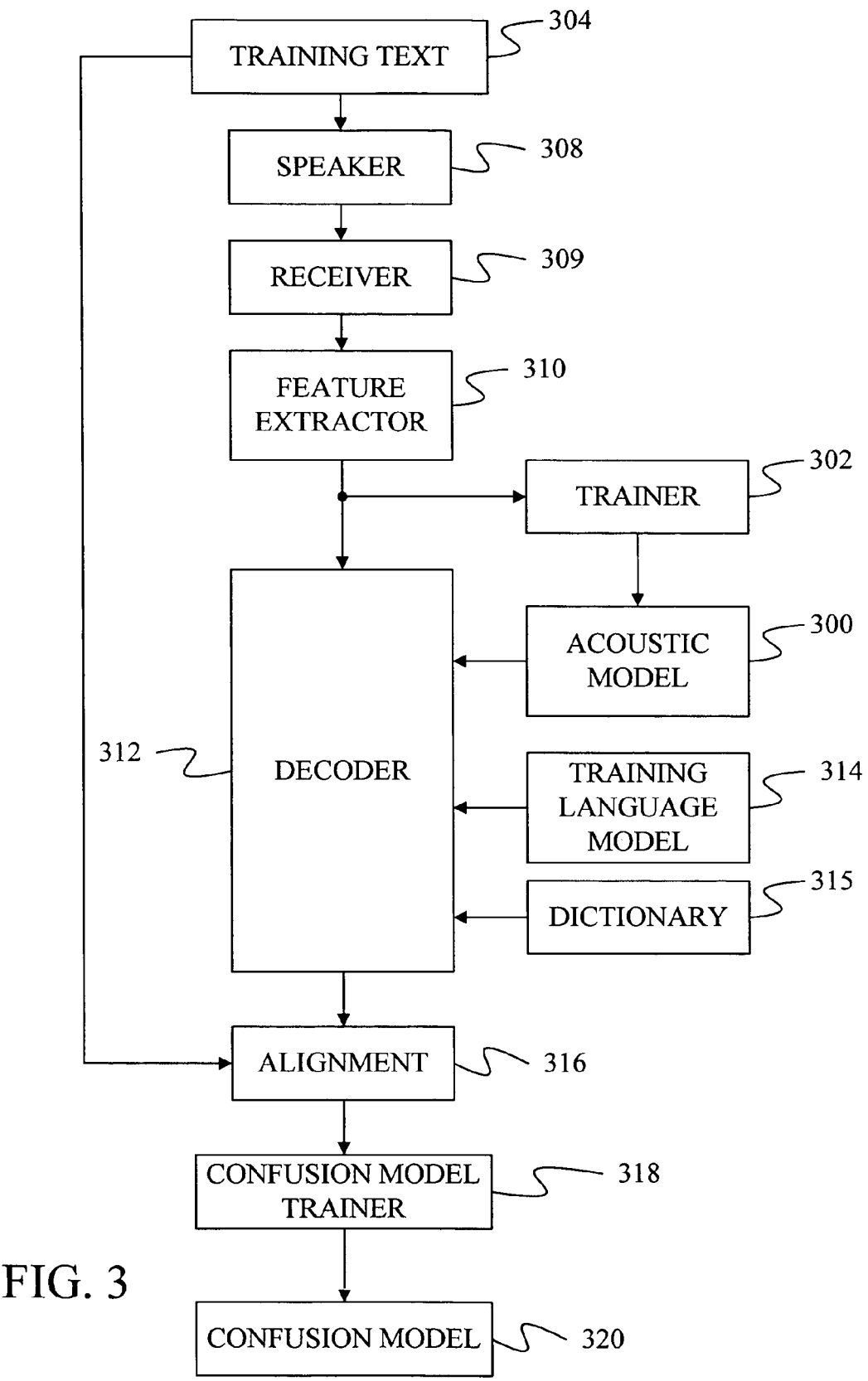
FIG. 3 is a block diagram of components used to train a confusion model under embodiments of the present invention.

At step 204, the predicted sequence of speech units is aligned with the actual sequence of speech units from training data 304. This is performed by an alignment module 316 in FIG. 3. Under one embodiment, this alignment is performed using dynamic programming in which possible alignments are compared to each other and the best possible alignment is selected based on the optimization of some objective function. Under one embodiment, this objective function is an error function that indicates the degree to which the predicted sequence of speech units differs from the actual sequence of speech units after the alignment is complete. Under some embodiments, the error function is a simple binary function in which an error value of one is produced if the two speech units that are aligned do not match and an error value of zero is produced if the two speech units do match. In other embodiments, different weights are applied to different types of errors. For example, speech units that provide similar sounds may have a lower error value than speech units that provide substantially different sounds.

The step of aligning the predicted sequence to the actual sequence of speech units is only performed in step 204 if the confusion model requires aligned speech units before it can be trained. For some types of confusion models, such as Hidden Markov Models, such alignment is not necessary, since the training of the model includes an inherent step of aligning the speech units.

At step 206, a confusion model 320 is constructed by a confusion model trainer 318. Under one embodiment, a Hidden Markov Model is constructed as confusion model 320.

Figure 4:
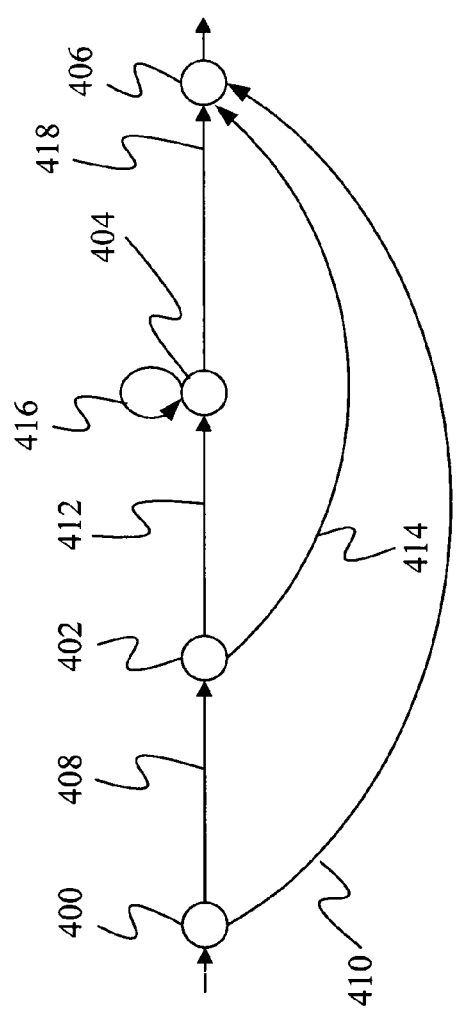
FIG. 4 is a state diagram of an HMM confusion model under one embodiment of the present invention.

FIG. 4 shows a four state Hidden Markov Model under one embodiment of the confusion model of the present invention. Under this embodiment of the invention, a separate Hidden Markov Model is constructed for each actual speech unit. Each Hidden Markov Model generates as output the predicted speech units that can be produced from that particular actual speech unit.

The four state model includes states 400, 402, 404 and 406. In the confusion model, states 400 and 406 are non-emitting states, and transitions leaving those states do not result in the production of a predicted speech unit. Transitions leaving states 402 and 404, on the other hand, produce a single predicted speech unit each time those transitions are used. At states 402 and 404, there is a separate output probability for generating each possible predicted speech unit.

The states are connected by transitions that have associated probabilities. The sum of the probabilities for the transitions leaving a state is equal to 1. Thus, the sum of the transition probabilities for transitions 408 and 410 is equal to 1 and the sum of the probabilities for transitions 412 and 414 is equal to 1.

Different paths through the model of FIG. 4 represent different replacement and insertion possibilities. For example, the path from state 400 to state 406 along transition 410 represents the replacement of the actual speech unit with no phone unit in the predicted sequence of speech units. The path from state 400 through states 402 and 406 along transitions 408 and 414 represents the substitution of a actual speech unit with a single predicted speech unit. Note that this path includes the situation where the actual speech unit is the same as the predicted speech unit. The path from state 400 through states 402, 404 and 406 along transitions 408, 412 and 418 represents the substitution of two predicted speech units for the actual speech unit, wherein one predicted speech unit is produced on transition out of state 402 and a second speech unit is produced on transition out of state 404.

State 404 includes a self transition 416 that provides a mechanism for having any number of predicted speech units in place of the actual speech unit.

Each Hidden Markov Model, such as the model of FIG. 4, is trained by first assuming equal probabilities for each predicted phonetic speech unit in states 402 and 404 and assuming equal transition probabilities for each of the transitions. This simple model is used to identify a best alignment between the actual speech units and the predicted speech units and thereby provide an alignment that can be used to train the state probabilities and transition probabilities for each HMM. With the updated models, the alignment is adjusted and the model retrained using the new alignment. This continues until the model becomes stable. This training procedure is also known as Viterbi training. In a slight variation of this training process, multiple alignments between the actual and predicted speech units can be considered. This is known as Forward-Backward or Baum-Welch training.

In other embodiments, the confusion model is constructed as a rule-based model in which each rule provides the probability of a conversion from a single speech unit in the actual sequence of speech units to zero, one, or more than one speech units in the predicted sequence of speech units. Under embodiments of the present invention, each rule may be context independent or context dependent. For context dependent rules, the rule may be dependent on the context to the left, to the right, or to the left and right of the single speech unit in the actual sequence. In addition, any number of speech units to the left or to the right of the single speech unit may be used under the present invention, and combinations of different context lengths may be used together such that two different rules can provide two different probabilities for converting an actual speech unit into a sequence of predicted speech units, with one rule using one context length and the other rule using a longer context length. The probabilities can be combined through interpolation or a single rule probability can be selected based upon the context.

To train the rule probabilities, the alignment between the actual sequence of speech units and predicted sequence of speech units is examined to determine the number of times that each rule could be used to convert an actual speech unit into a sequence of predicted speech units. This count is divided by the number of times that the single speech unit in the actual sequence of speech units is found in the particular context associated with the rule. Thus, each probability indicates the likelihood of producing a sequence of predicted speech units given an actual speech unit and, if desired, a particular context in the sequence of actual speech units.

Under one embodiment of the invention, speech units can be inserted into the predicted sequence without requiring the replacement of an actual speech unit. This is achieved by inserting an empty speech unit, $\epsilon$, between each speech unit in the actual sequence of speech units before alignment. During alignment, such empty speech units will typically be aligned with nothing in the predicted sequence. However, occasionally, the $\epsilon$ speech unit will be aligned with one or more speech units in the predicted sequence. As a result, rules are generated for converting from the empty speech unit to the predicted speech units that are found in the alignment.

Under one embodiment of the invention, after the probability for each rule has been generated, some of the rules are pruned to reduce the number of rules in the rule set and thereby simplifying decoding. This pruning may be done based on the number of times that the context and the single speech unit are found in the actual sequence of speech units or may be done based on the number of times that the context and actual speech unit produces a particular sequence of predicted speech units. In the later case, the probabilities for the rules that share the same context as the rule that was pruned but provided a different sequence of predicted speech units must be recalculated so that the sum of the probabilities with the same context and actual speech unit is equal to one.

Figure 5:
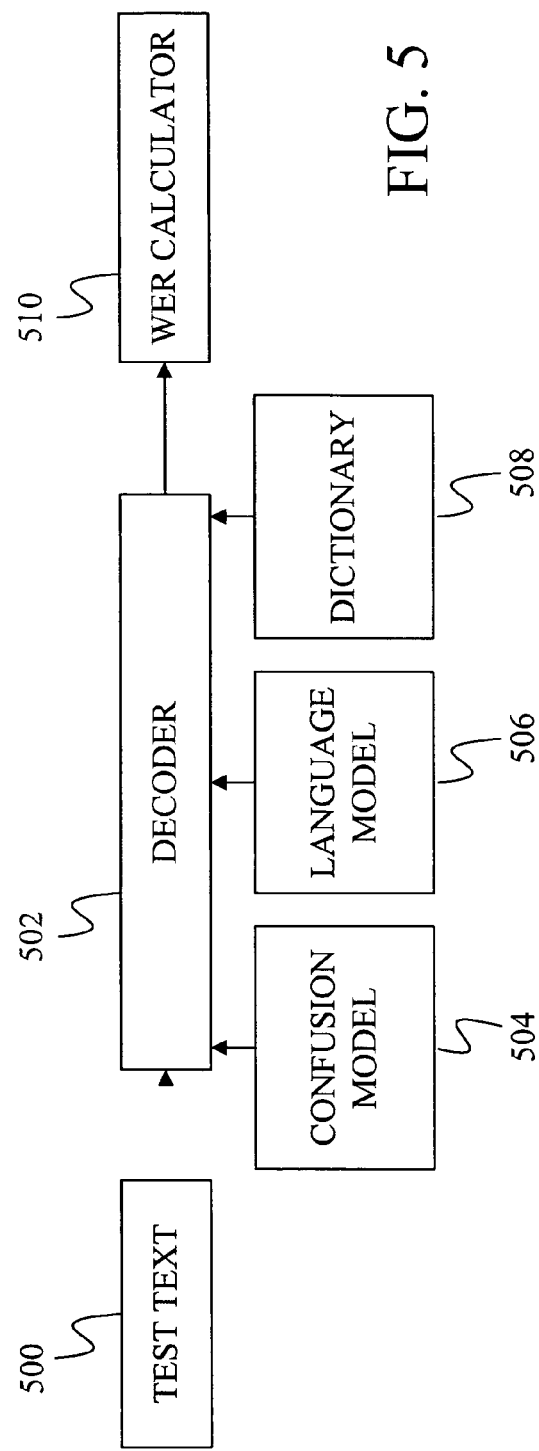
FIG. 5 is a block diagram of a decoder that utilizes text and a confusion model to determine a word error rate.

After the confusion model has been constructed at step 206, it can be used to model the performance of the acoustic model without requiring the production of an acoustic signal. At step 208, a test text, 500, of FIG. 5, is decoded by a decoder 502 using a confusion model 504, a dictionary 508, and a language model 506. Decoder 502 generates a set of predicted sequences of words together with the probabilities for each sequence as calculated using confusion model 504, dictionary 508 and language model 506. Decoder 502 also passes the actual word sequences in test text 500.

Language model 506 used by decoder 502 is different than training language model 314 in most embodiments. Typically, training language model 314 is selected to be a weak language model such that the confusion model indicates the weaknesses of acoustic model 300. Language model 506, on the other hand, is a strong language model that is more similar to the language model that will be used in a speech recognition system. In some embodiments, different language models are used with the same confusion model 504 and test text 500 to determine the relative performance of the two language models based on a word error rate calculated as discussed further below.

Figure 6:
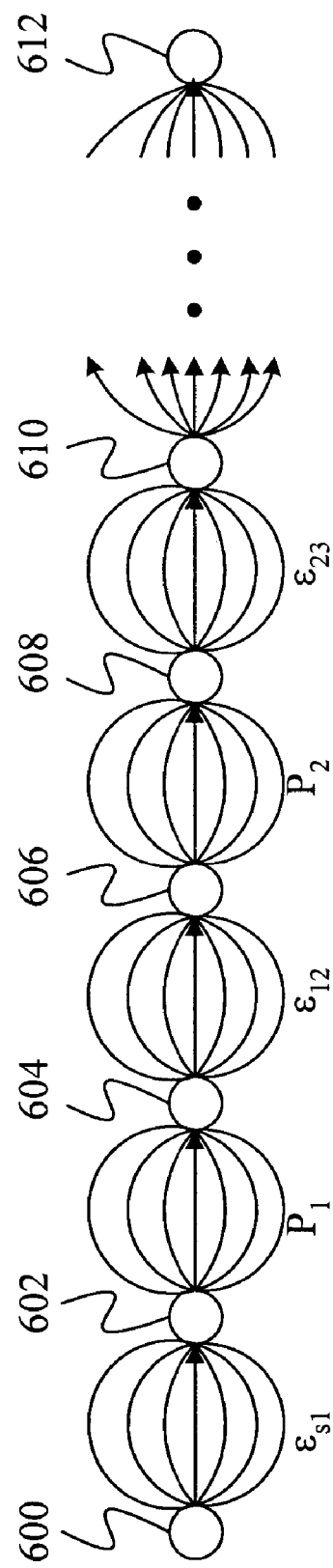
FIG. 6 is a trellis diagram showing the paths formed during decoding under one embodiment of the present invention.

Under a rule-based confusion model, decoder 502 applies the rules in confusion model 504 to construct a network which represents a set of paths representing possible sequences of predicted speech units, such as the paths of FIG. 6. In FIG. 6, transitions are shown between states 600, 602, 604, 606, 608 and 610. The transitions between any two states represent sequences of predicted speech units that have some probability of being used in place of a particular speech unit in the actual sequence of speech units represented by test text 500. For example, the transitions between state 602 and 604 represent all of the predicted sequences of speech units that can be used in place of a speech unit P1. Similarly, the transitions between state 604 and 606 represent all the transitions that can be inserted between speech unit P1 and speech unit P2 of the actual sequence of speech units. Note that a transition can be provided for no speech unit in the predicted sequence of speech units. Thus, one of the transitions between state 602 and 604 may contain an $\epsilon$ representing no speech unit. This indicates that the actual speech unit P1 is simply removed in the predicted sequence of speech units. The network also contains states and transitions corresponding to the empty speech unit $\epsilon$. These are inserted in alternating positions along with the actual speech units as shown in FIG. 6 between state 600 and 602; state 604 and 606. These transitions correspond to the rules for insertion which correspond to the empty speech unit $\epsilon$.

In FIG. 6, each transition has a particular probability. To generate predicted word sequences from the network which has been generated for the test text, the decoder explores the paths in the network by traversing the network. Standard graph traversal strategies such as depth-first-search or breadth-first-search may be used here. Each path explored by the decoder corresponds to a sequence of predicted speech units.

To increase the efficiency and to restrict the number of paths explored by the decoder, the decoder may choose to prune (i.e. eliminate from further consideration) partial paths generated during the traversal. For example, if a partial path corresponds to a predicted speech unit sequence which does not match a partial prefix of any speech unit sequence corresponding to any word sequence, then such a partial path can be pruned. Partial paths with low probability compared to other partial or complete paths may also be pruned.

To provide further guidance to pruning, the decoder may first generate the predicted speech unit sequence which is identical to the actual speech unit sequence. Such a sequence will typically have a high probability and will aid in identifying other paths with low probability.

When decoder 502 reaches end state 612 along a particular path, it has available to it, the sequence of predicted speech units which corresponds to the explored path along with its associated probability. The decoder then identifies all the word sequences which can produce the predicted speech unit sequence by matching the speech unit sequence corresponding to the word unit sequence against the predicted speech unit sequence.

After the decoder has explored all the paths in the network, it assigns probabilities to the predicted word sequences according to the equation below. It should be noted that in order to simplify the presentation, we have made several simplifying assumptions in deriving the equation. For example, we have assumed that there is a single pronunciation (i.e a speech unit sequence) for each word.

$$p(W_p | W_c) = \frac{P(W_p)}{\sum_{W_{p'}:\varphi(W_{p'})=\varphi(W_p)} P(W_{p'})} \cdot \sum_{\bar{t}:\varphi(\bar{t})=\varphi(W_p)} p(\bar{t} | \varphi_c) \qquad \text{EQ. 1}$$

where $p(W_p|W_c)$ is the probability of a predicted word sequence, $W_p$, given an actual word sequence, $W_c$; $P(W_p)$ is the language model probability for the predicted word sequence; the summation in the denominator is the summation of all language model probabilities for all predicted word sequences that have the same sequence of speech units as the predicted word sequence $W_p$, and $p(\bar{t}|\varphi_c)$ is the total probability along a path $\bar{t}$ through the network with the sum being taken over all paths that produce the same sequence of speech units as the sequence in $W_p$. $\varphi(W_p)$ represents the speech unit sequence corresponding to the word sequence $W_p$ and $\varphi(\bar{t})$ represents the predicted speech unit sequence along path $\bar{t}$. The probability for each path $p(\bar{t}|\varphi_c)$ is determined as the product of the individual probabilities associated with each transition along the path. Note that different paths through the decoder trellis can have the same sequence of predicted speech units because of the $\epsilon$ transitions, which are not considered to be speech units for the purpose of determining the similarity of the paths. For example, the sequence t-$\epsilon$-iy would be considered to be the same as the sequence t-iy-$\epsilon$ because the $\epsilon$ speech units are ignored when determining the similarity of the sequences.

After the probabilities for each of the predicted word sequences have been determined, errors between the predicted word sequences and the actual word sequences are identified at step 210 by a word error rate calculator 510. The errors are determined by identifying differences between words in the predicted word sequence and words in the actual word sequence provided by decoder 502.

At step 212, the errors are used to generate a word error rate for test text 500. Under one embodiment, the expected value for the word error rate is determined as:

$$E[WER] = \frac{\sum_{i=1}^{I} E[e_i]}{\sum_{i=1}^{I} N_i} \qquad \text{EQ. 2}$$

where E[WER] is the expectation of the word error rate for test text 500; $E[e_i]$ is the expected value of the number of errors for sentence i in the test text; $N_i$ is the number of words in actual sentence i; and I is the total number of sentences in test text 500.

Under one embodiment, $E[e_i]$ is equal to the sum of the product of the number of errors for each word sequence predicted for sentence i and the probability of that predicted word sequence. This can also be written as an equation:

$$E[e_i] = \sum_{W_p} ErrCount(W_p, W_c) * p(W_p | W_c) \qquad \text{EQ. 3}$$

Here, $W_c$ is the actual word sequence in sentence i; ErrCount($W_p$,$W_c$) is the number of errors identified by matching predicted word sequence $W_p$ against the actual word sequence $W_c$; and $p(W_p|W_c)$ is the probability of predicted word sequence $W_p$ given the actual word sequence $W_c$. The summation is taken under all the predicted word sequences.

In other embodiments, the expected number of errors for a sentence is calculated by weighting errors based on the types of errors that were made. In other words, the computation of ErrCount($W_p$,$W_c$) is done by weighting errors based on the types of errors.

Thus, using equation 2, it is possible to generate a word error rate for the test text. Since each sentence in the test text is examined separately, it is also possible to identify those word sequences in the test text that are likely to generate large numbers of errors when decoded by the speech recognition system. Note that the system shown above does not require acoustic data to determine how the speech recognition system will perform with the text. This greatly reduces the cost of evaluating a speech recognition system relative to various tasks. This also allows developers to change the manner in which they ask users for input such that the user is guided to using sequences of words that the speech recognition system is able to decode more easily.

In addition, the present invention allows multiple language models to be compared with each other. This can be done by determining the word error rate using one language model and then determining the error rate using a second language model. The word error rates are then compared to each other to determine the relative performance of the language models.

Additionally, the present invention allows language models to be trained with the acoustic model using discriminative training that is based on the word error rate calculated at step 212. Under such training, the language model is modified so as to improve the word error rate. Since this training is based in part on the performance of the acoustic model, it is thought that the resulting language models will perform better than language models that are trained without reference to the performance of the acoustic model.

Although the present invention has been described with reference to particular embodiments, workers skilled in the art will recognize that changes may be made in form and detail without departing from the spirit and scope of the invention.

What is claimed is:

1. A method of modeling a speech recognition system, the method comprising:
   decoding a speech signal produced from a training text, the training text comprising a sequence of actual speech units to produce a sequence of predicted speech units;
   constructing a confusion model based on the sequence of actual speech units and the sequence of predicted speech units; and
   decoding a test text using the confusion model and a language model to generate at least one model-predicted sequence of speech units.

2. The method of claim 1 wherein constructing a confusion model comprises constructing a Hidden Markov Model.

3. The method of claim 2 wherein constructing a Hidden Markov Model comprises constructing a four state Hidden Markov Model.

4. The method of claim 3 further comprising generating a probability for each model-predicted sequence of speech units.

5. The method of claim 4 further comprising using the probability for a model-predicted sequence of speech units to identify word sequences in the test text that are likely to generate an erroneous model-predicted sequence of speech units.

6. The method of claim 1 further comprising:

decoding the test text using a first language model with the confusion model to form a first set of model-predicted speech units; and decoding the test text using a second language model with the confusion model to form a second set of model-predicted speech units.

7. The method of claim 6 further comprising using the first and second sets of model-predicted speech units to compare the performance of the first language model to the performance of the second language model.

8. The method of claim 6 wherein the steps of decoding the test text using the first and second language model form part of a method of discriminative training of a language model.

9. The method of claim 1 wherein decoding the speech signal comprises using a training language model to decode the speech signal, wherein the training language model does not perform as well as the language model used to decode the test text.

* * * * *